(12) United States Patent
Takimoto et al.

(10) Patent No.: US 6,977,002 B2
(45) Date of Patent: Dec. 20, 2005

(54) FUEL REFORMING APPARATUS AND THE METHOD OF STARTING IT

(75) Inventors: Hidetoshi Takimoto, Tokorozawa (JP); Minoru Mizusawa, Matsudo (JP); Yasuhiko Fukuchi, Koutou-ku (JP); Yasunori Kotani, Wako (JP)

(73) Assignees: Ishikawajima-Harima Heavy Industries Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 388 days.

(21) Appl. No.: 10/197,862

(22) Filed: Jul. 19, 2002

(65) Prior Publication Data

US 2003/0019156 A1    Jan. 30, 2003

(30) Foreign Application Priority Data

Jul. 27, 2001  (JP) ............................. 2001-227472
Oct. 9, 2001   (JP) ............................. 2001-310874

(51) Int. Cl.[7] .............................................. B10J 7/00
(52) U.S. Cl. ........................... 48/61; 48/197 R; 123/3; 422/231; 422/239; 429/12; 429/13; 429/14; 429/15; 429/16; 429/17; 429/18
(58) Field of Search ................ 48/61; 123/3; 422/231, 422/239; 429/12–18

(56) References Cited

U.S. PATENT DOCUMENTS 4,033,133 A    7/1977    Houseman et al.

6,390,030 B1 *  5/2002  Isogawa et al. ................. 123/3
6,472,092 B1 * 10/2002  Matsuda et al. ............... 429/17

FOREIGN PATENT DOCUMENTS

| EP | 0 842 894 A1 | 5/1998 |
|---|---|---|
| JP | 63-050302 | 3/1988 |
| JP | 06-256001 | 9/1994 |
| JP | 06-279001 | 10/1994 |
| JP | 08-157201 | 6/1996 |

OTHER PUBLICATIONS

European Search Report for corresponding European Application, completed Dec. 15, 2003, by K. Engelen, and mailed Dec. 22, 2003, from the Hague.

* cited by examiner

Primary Examiner—Alexa Doroshenk
Assistant Examiner—Vinit H. Patel
(74) Attorney, Agent, or Firm—Griffin & Szipl, P.C.

(57) ABSTRACT

A reforming catalyst is composed of a plurality of catalyst layers arranged in series, and when started from a low temperature, preheated air is supplied in parallel to a point upstream of each catalyst layer, thereby the catalyst in each layer is self-heated simultaneously so that the catalyst is heated. After the catalyst is heated, feed of air is temporarily stopped, and supply of fuel gas is started. Next, air is supplied while controlling its flow rate so that temperatures in the catalyst do not exceed the temperature that the catalyst can withstand. Thus, no other special equipment is needed, and the catalyst can be started quickly (cold start). The catalyst can be made compact enough to install it in a electric vehicle.

5 Claims, 6 Drawing Sheets

Fig.1

Prior art

BEGINNING OF WARMING THE REFORMER
(FEEDING HIGH-TEMPERATURE GAS FOR WARMING)

FUEL REFORMING APPARATUS AND THE METHOD OF STARTING IT

BACKGROUND OF THE INVENTION

1. Technical Field of the Invention

The present invention relates to a fuel reforming apparatus for quick starting or cold starting fuel cells wherein a fuel is reformed to a gas containing hydrogen, without needing any special equipment or utilities, and the method of starting it.

2. Description of Prior Art

Recently, research and development of fuel cell electric vehicles has been carried out positively, in particular Polymer Electrolute Fuel Cell (PEFC) with a rather low operating temperature (about 100 degrees C.) have good prospects as fuel cell. The use of methanol as a fuel is considered to be advantageous because it is easy to supply and there is no need to construct an infrastructure. For this purpose, a reformer is indispensable to convert the methanol to hydrogen.

Conventional reformers that reform methanol include, for example, the "Methanol reformer" (unexamined Japanese Patent Publication No. 50302, 1988). This reformer contains a reforming catalyst in a hollow cylindrical reaction tube, the catalyst is heated by combustion gases from burning fuel that is supplied to the outside, and the fuel gas flowing inside the tube is reformed.

However, the "Methanol reformer" specified in the unexamined Japanese Patent Publication No. 50302, 1988 presents difficulties for installing in a electric vehicle, such as (1) its large and heavy structure, (2) long starting time, (3) low response to load variations, and (4) a high concentration of CO in the hydrogen gas produced by the reformer, which attacks the electrodes of the fuel cell.

As an example of a means known in the prior art to produce hydrogen gas from methanol with a high conversion ratio, the "Method of manufacturing gas containing hydrogen" (unexamined Japanese Patent Publication Nos. 256001, 1994 and 279001, 1994) is disclosed. This method basically puts methanol, oxygen and water in contact with a heated catalyst and produces a reaction, wherein partial oxidation of the fuel takes place.

However, the "Method of manufacturing gas containing hydrogen" according to the unexamined Japanese Patent Publication No. 256001, 1994 or 279001, 1994 suffers from the problems that (5) preheating of the catalyst is time consuming and (6) although the concentration of CO can be reduced to a degree that is suitable for conventional phosphate fuel cells (about 1%), the CO concentration is still too high for application to a solid polymer fuel cell (PEFC) suitable for mounting on a car.

Figure 1:
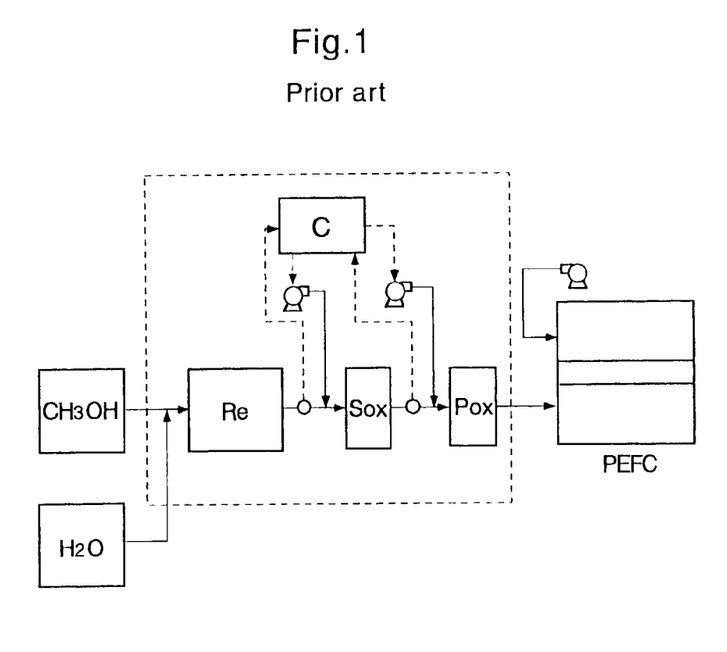
FIG. 1 shows the configuration of a conventional fuel processing apparatus for fuel cells.

Another disclosure in the prior art is "Fuel reforming apparatus" (unexamined Japanese Patent Publication NO. 157201, 1996) that can produce gas containing hydrogen with an extremely low CO concentration. As shown in FIG. 1, this apparatus is composed of a reformer Re, a selective oxidation unit Sox, a partial oxidation unit Pox and a control device C; only some of the carbon monoxide is oxidized in the selective oxidation unit Sox, the rest of the carbon monoxide is oxidized in the partial oxidation unit Pox, thereby producing hydrogen gas containing a very low CO concentration (several ppm), so that the apparatus can be applied to a PEFC.

Unfortunately, the "Fuel reforming apparatus" in the unexamined Japanese Patent Publication No. 157201, 1996 has the problems of a long starting time and poor response to load variations because the apparatus is of the same indirect heating type as that described in the unexamined Japanese Patent Publication No. 50302, 1988.

In the conventional methods described above, a large amount of inert gas (for example, nitrogen gas) is heated by a heat source such as an electric heater or catalyst combuster, and is fed in through a fuel supply line, thereby heating the whole reformer. However, because of the large heat capacity of the reformer, a long time is required for the whole reformer to reach the required temperature, so when the reformer is mounted on a electric vehicle, it takes a long time to start the car from a low-temperature condition (cold start), which is a practical problem.

Another problem relevant to the aforementioned reformer is that, if a fuel gas (a gas mixture of methanol and water) is supplied when the catalyst layer of the reformer is not heated sufficiently (to a temperature at which reforming occurs), the fuel gas condenses in a low-temperature range without being reformed and moistens the catalyst, thereby deteriorating the performance of the catalyst, and the unreformed fuel gas remaining in the catalyst layer is not completely reformed before being fed to the fuel cell, and rapidly poisons the fuel cell.

SUMMARY OF THE INVENTION

The present invention aims at solving the above-mentioned various problems. More explicitly, objects of the present invention are to provide a fuel reforming apparatus that does not need any special devices or utilities, can be started quickly (cold start), can prevent the reforming catalyst and the fuel cells from being poisoned, and can be made compact enough to mount on a car, and the method of starting the apparatus.

The present invention provides a fuel reforming apparatus composed of a partial oxidation reformer (14) that is filled with a fuel reforming catalyst (15) to convert a fuel gas into a reformed gas containing hydrogen by using heat generated by partially oxidizing the fuel gas which contains steam, an air feed line (20) that supplies the aforementioned partial oxidation reformer with air and a flow controller (22) that controls the rate of flow of air in the above-mentioned air feed line; whereby when the apparatus is started at a low temperature, air that has been preheated to a temperature at which the above-mentioned catalyst can be oxidised, is supplied through the air feed line while the flow of the above-mentioned fuel gas is stopped, thus the aforementioned catalyst heats itself and the entire catalyst is heated up.

The present invention also offers the method of starting the fuel reforming apparatus whereby when starting the partial oxidation reformer (14) at a low temperature, that is filled with the combustible reforming catalyst (15) for converting the fuel gas into the reformed gas containing hydrogen by partially oxidizing the fuel gas with the steam contained in it and using the heat generated thereby, the air that has been preheated to the temperature at which the above-mentioned catalyst can be oxidized while the feed of the above-mentioned fuel gas is stopped, thereby the aforementioned catalyst is made to generate heat internally so as to increase the temperature of the whole catalyst.

According to the above-mentioned method and apparatus of the present invention, since when the apparatus is started up from a low temperature, the air preheated to the temperature that enables the combustible reforming catalyst (15) to be oxidized (for instance, about 100 degrees C.) is fed from the air feed line (20) while the supply of the above-mentioned fuel gas is stopped, so making the catalyst produce heat internally and the entire catalyst is heated up, no devices or utilities other than the air feed line (20) are required, so the reforming system can be made so compact that it can be conveniently installed in a electric vehicle. Because the catalyst that is in a reduced state is oxidized and generates its own heat when it is supplied with air, no corrosive gasses such as CO are produced, so the reforming catalyst and the fuel cells can be essentially prevented from being attacked chemically.

According to a preferred embodiment of the present invention, the above-mentioned combustible reforming catalyst (15) is made of a plurality of layers (15a, 15b, 15c) of catalyst which are disposed in series with intervals between each other; the aforementioned air feed line (20) is provided with a plurality of branch lines (20a, 20b, 20c) that supply the upstream side of each catalyst layer with air independently; in addition, preheating devices (19a, 19b) for preheating each branch line are provided; when starting up the apparatus from a low temperature, while the feed of the aforementioned fuel gas is stopped, the air preheated in the preheating devices is supplied in parallel through each branch line, thus the catalyst in each layer of catalyst is made to produce heat internally at the same time, and the temperature of the entire catalyst is increased.

Using the above-mentioned method and apparatus, since a plurality of catalyst layers arranged in several stages can be heated up in parallel, the time taken to heat the catalyst can be greatly reduced and the apparatus can be started quickly (cold start).

Each of the above-mentioned catalyst layers (15a, 15b, 15c) is composed of a first catalyst that is deposited upstream and is capable of withstanding higher temperatures than that of the layer arranged downstream, and a second catalyst disposed downstream with a higher reforming performance than that of the upstream catalyst.

Using this configuration, the temperature of the catalyst can be raised as the upstream catalyst can produce heat in a wide range without exceeding the temperature that the catalyst can withstand, so a large amount of a fuel gas can be converted to a reformed gas downstream thereof. Since the catalyst is prevented from being overheated, the life of the catalyst is extended, and in addition, the production of CO which occurs at a high temperature can be suppressed.

According to a preferred method of the present invention, the entire catalyst is heated up to a temperature at which the fuel gas can be burned and reformed, and after the supply of air has been temporarily stopped, feeding the fuel gas starts, next the flow of air is controlled and air is supplied at such a rate that the temperature in the aforementioned catalyst does not exceed the temperature that the catalyst can withstand.

Using the method described above, the catalyst can be protected from being overheated by the hot gasses, when the aforementioned fuel gas is supplied, therefore, the life thereof can be extended.

Other objects and advantageous features of the present invention are revealed in the following description and by referring to the attached drawings.

DESCRIPTION OF PREFERRED EMBODIMENTS

Preferred embodiments of the present invention are described below referring to the drawings. Components used in common in each drawing are identified with the same numbers, and no duplicate description is given in the text.

Figure 2:
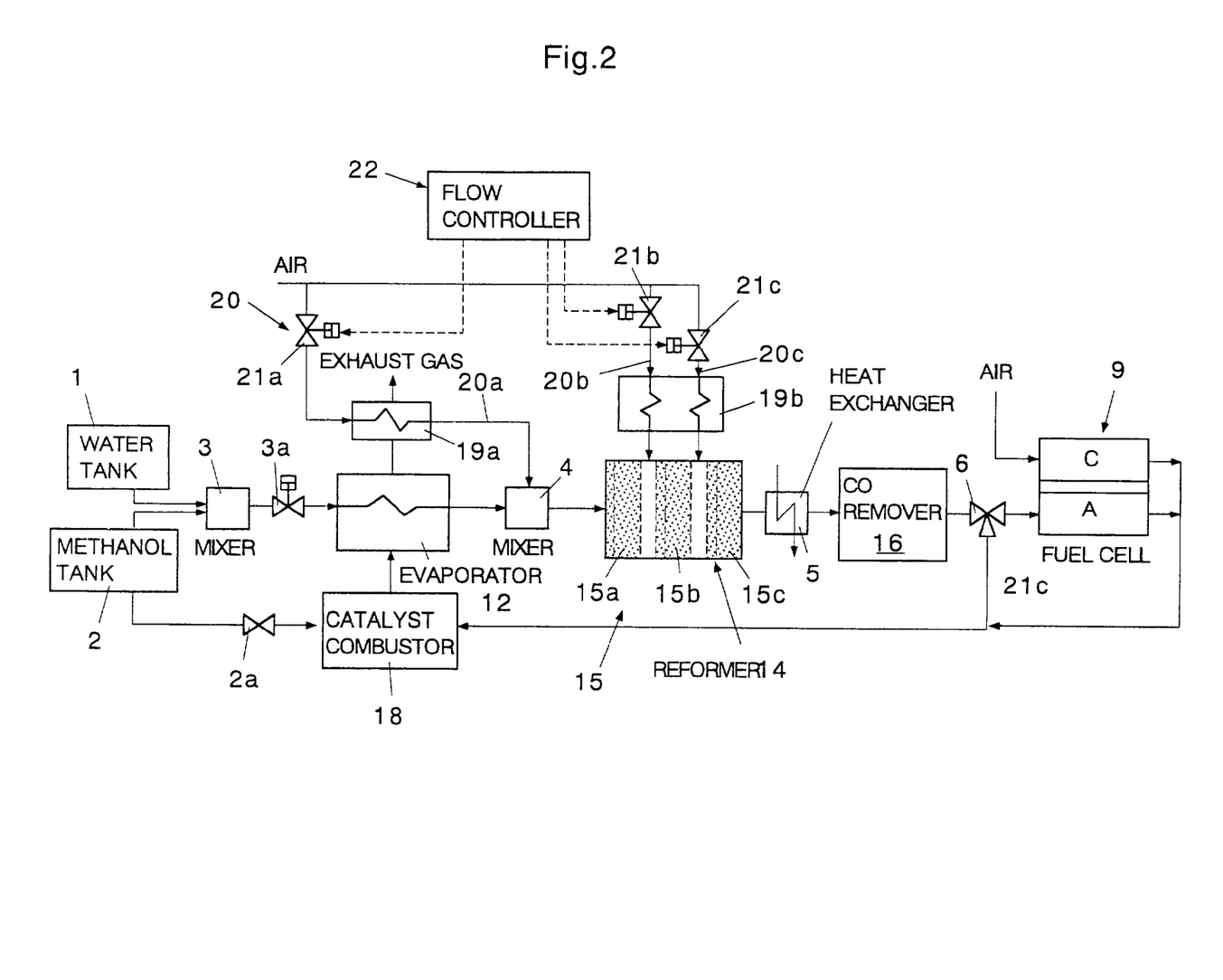
FIG. 2 shows a system configuration of a fuel reforming apparatus according to the present invention.

FIG. 2 shows the configuration of the system of a fuel reforming apparatus according to the present invention. In FIG. 2 parts are identified by number 1 for a water tank, 2 for a methanol tank, 2a for a methanol injector, 3 for a mixer and 3a for a fuel injector. The methanol injector 2a is, for example, a flow control valve or a fuel pump that, when the apparatus is started, transfers methanol from the methanol tank 2 to the catalyst combustor 18, thereby causing the fuel to burn. In addition, water in the water tank 1 and methanol in the methanol tank 2 are mixed in the mixer 3, and a mixed fluid of water and methanol (water methanol fuel) is injected into an evaporator 12 while the flow rate thereof is controlled by the fuel injector 3a. The fuel injector 3a is, for instance, a flow control valve or a fuel pump.

Furthermore, the evaporator 12 is, for instance, an indirect heat exchanger that heats and evaporates the water methanol fuel (mixed fluid of water and methanol) supplied from the fuel injector 3a using exhaust gas produced by combustion in the catalyst combustor 18, thus producing a fuel gas containing steam.

The following detailed description relates to the case where the fuel is a water methanol fuel (mixed fluid of water and methanol) and the fuel gas has been produced by evaporating that fuel. However, the present invention is not restricted only to this case, but the invention can be applied also to other liquid fuels and other fuels in the same manner as above.

In FIG. 2, parts are identified by the number 4 for the mixer, 5 for the heat exchanger and 6 for a 3-way valve; air and the aforementioned fuel gas are mixed in the mixer 4 and are supplied to the reformer 14 (partial oxidation reformer), high-temperature reformed gas discharged from the reformer 14 is cooled to a temperature appropriate for the CO remover 16, by the heat exchanger 5, and the 3-way valve 6 is used to switch the supply of gas discharged from the CO remover 16 to either a fuel cell 9 (PEFC) or the catalyst combustor 18. For this purpose, two 2-way valves (opening/closing valves) can also be used in place of the 3-way valve 6.

The partial oxidation reformer 14 is filled with a combustible reforming catalyst 15 that partially oxidizes the fuel gas containing steam, and using the heat generated thereby, converts the fuel gas into a reformed gas containing hydrogen. The combustible reforming catalyst 15 may preferably be a reforming catalyst of the copper-zinc group.

The combustible reforming catalyst 15 is composed of a plurality (three layers in this example) of catalyst layers 15a, 15b, 15c disposed in series with spaces between them. Each catalyst layer 15a, 15b or 15c is comprised of a first catalyst arranged upstream with the capability of withstanding higher temperatures than the second catalyst which is located downstream with a reforming performance higher than that of the first catalyst located upstream.

The ratio of the size of the first catalyst to the second one is predetermined so that the temperature of the high-temperature zone created on the upstream of the catalyst layer will not exceed the withstanding temperature of the first catalyst (for instance, 350 degrees C.), and that the highest temperature of the downstream catalyst will not exceed the withstanding temperature of the catalyst (for example, 300 degrees C.). Thus, during normal operation, a large amount of heat is generated in a wide upstream range so as to increase the temperature of the catalyst, and so that a large amount of fuel gas can be converted to a reformed gas downstream thereof. This configuration also brings another merit that the catalysts can be protected from being overheated, so that the lives of the catalysts are extended and the production of CO which occurs at high temperatures can be avoided.

Using the aforementioned configuration of the fuel reforming apparatus, during normal operation, the mixer 4 mixes air with the fuel gas and supplies the mixture to the partial oxidation reformer 14, the reformer 14 converts the fuel gas to a reformed gas containing hydrogen, the heat exchanger 5 cools the reformed gas discharged from the reformer 14 at a high temperature to a temperature suitable for the CO remover 16, the CO remover 16 reduces the CO concentration and supplies the reformed gas to the fuel cell 9 (PEFC), and the fuel cell 9 generates power electrochemically using the gas supplied from the reformer and air. Furthermore, exhaust gas from the fuel cell (reformed gas and air) is fed to the catalytic combustor 18 in which the combustible component is burned and the combustion produces a high-temperature exhaust gas which is supplied to the above-mentioned evaporator. Therefore, using this fuel reforming apparatus and the fuel cell, electric power can be supplied to a motor to drive an electric vehicle using methanol as fuel.

In FIG. 2, the fuel reforming apparatus of the present invention is further provided with an air feed line 20 that supplies air to the partial oxidation reformer 14 and a flow controller 22 for controlling the flow of air in this air feed line. The air feed line 20 is provided with a plurality (three in this example) of branch lines 20a, 20b, 20c that independently supply air upstream of each catalyst layer 15a, 15b or 15c. Each branch line is also provided with an air injector 21a, 21b or 21c so that the flow of air can be controlled individually. Air injectors 21a, 21b, 21c should preferably be flow control valves that can control the flow of air.

In addition, the branch lines are provided with preheating devices 19a, 19b for preheating the lines. The preheating device 19a preheats the air using combustion exhaust gas discharged from the evaporator 12, in this example. The preheating device 19b, in this example, heats the air in the branch lines 20b, 20c using another heat source such as an electric heater.

Figure 3A:
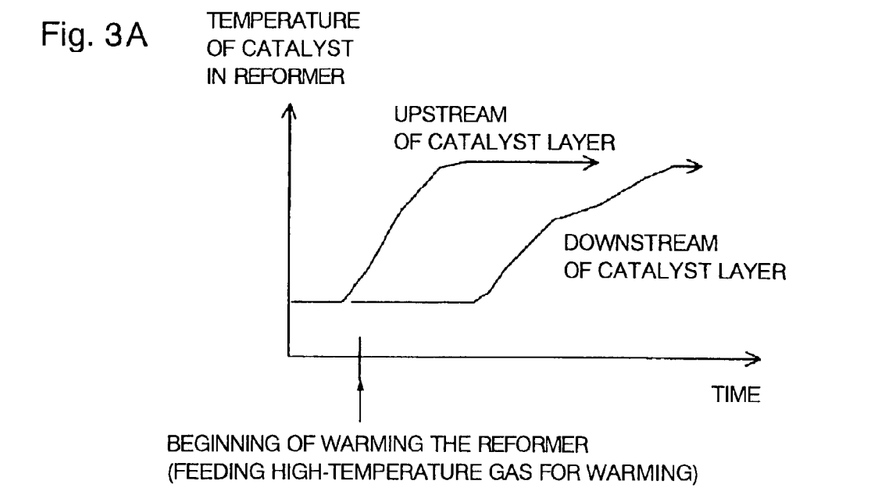
FIGS. 3A and 3B are diagrams showing how to start up the apparatus according to the present invention from a low temperature.
Figure 3B:
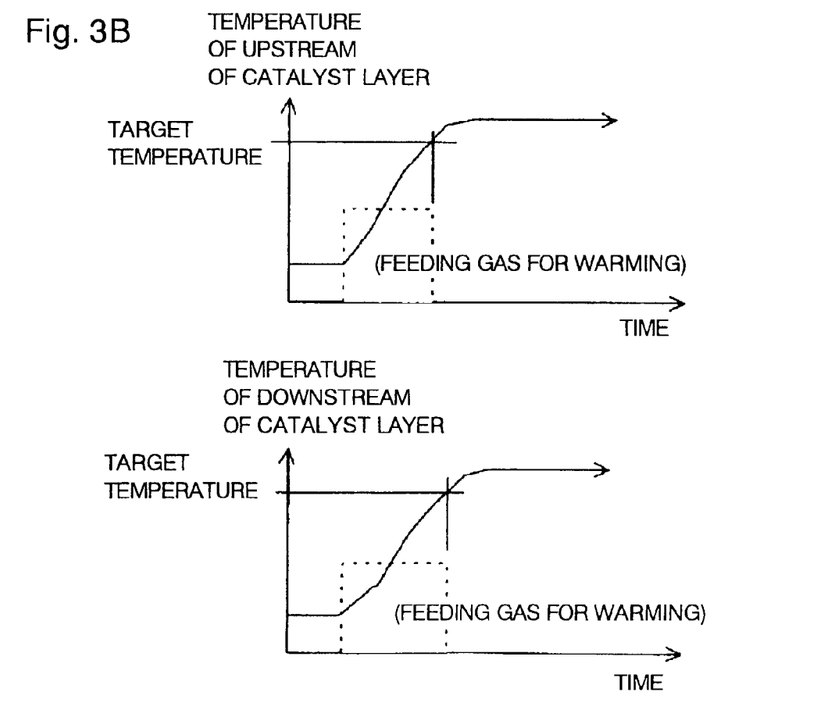

FIGS. 3A and 3B describe the starting methods from a low temperature according to the present invention.

Figure 4:
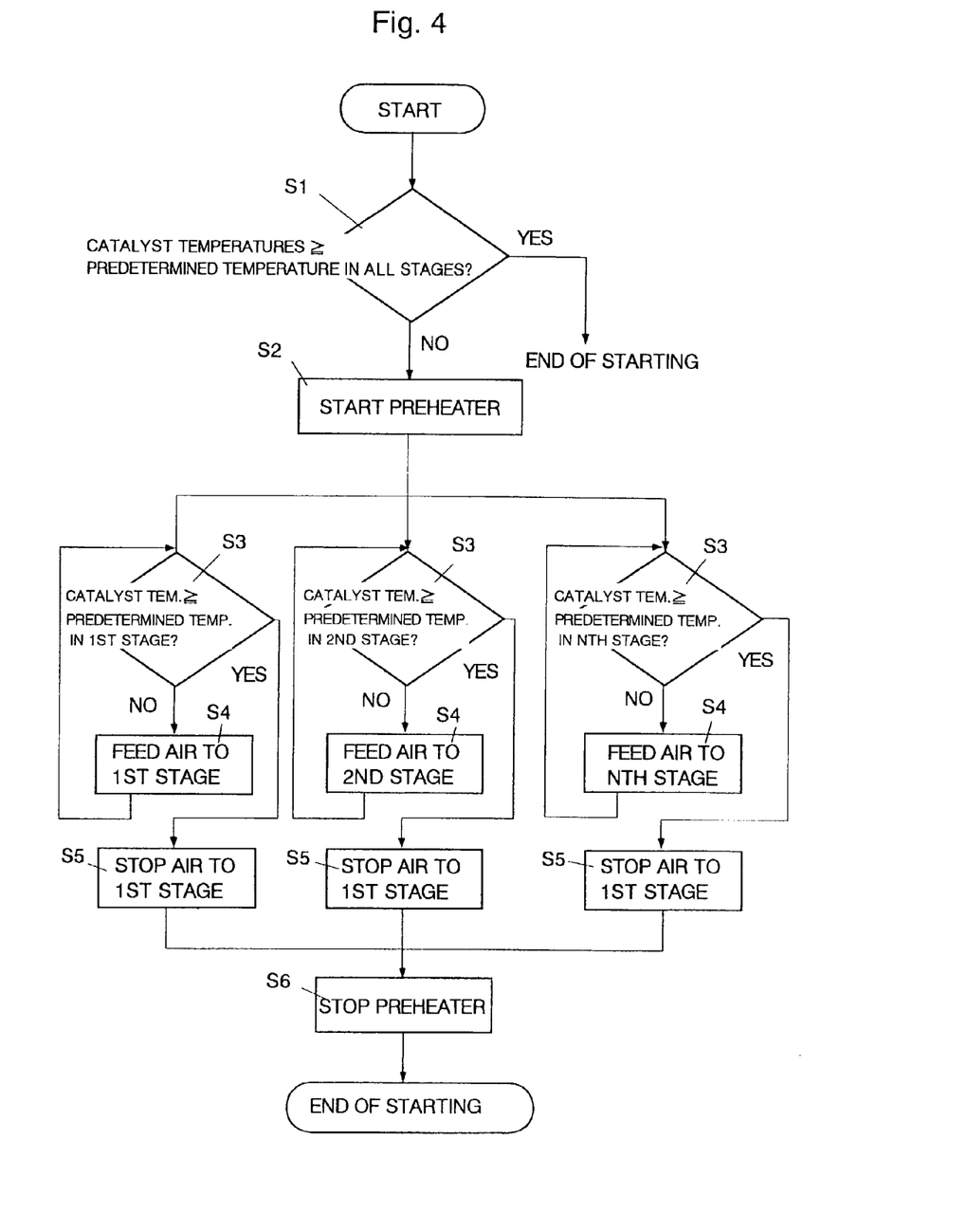
FIG. 4 is a control flow chart for the method of starting the apparatus according to the present invention from a low temperature.

FIG. 3A relates to a conventional method, and FIG. 3B shows the method of the present invention. FIG. 4 is a control flow chart for the low-temperature starting method according to the present invention. "Low-temperature start" in the present invention means a starting operation when the temperature of the reforming catalyst is at or below the minimum temperature at which it can be started by the reforming reaction.

According to conventional methods, the entire reformer is heated by feeding an inert gas heated by a heat source such as an electric heater, into a fuel feed line. Consequently, a large amount of inert gas is required, and as shown in FIG. 3A, since the second catalyst layer does not begin to heat until the first catalyst layer is completely heated, it takes a long time before the reformer as a whole reaches the required temperature.

On the other hand, according to the method of the present invention, typically the fuel injector 3A is fully closed when the apparatus is started from a low temperature, and while the supply of fuel gas is stopped, air that has been preheated in preheating devices 19a, 19b to a temperature at which the catalyst can be oxidized (about 100 degrees C. or less) is supplied to the upstream side of each catalyst layer 15a, 15b and 15c, in parallel.

That is, as shown in FIG. 4, when a starting signal is activated the catalyst temperature in each stage is compared with a predetermined temperature (for instance, 170 degrees C.) in step S1, and if all the catalyst temperatures are higher, it is judged that a hot start can be activated, so the starting operation proceeds normally to completion; if the measured catalyst temperatures are lower than the predetermined temperature, the preheating device is started (S2). Next, the catalyst temperature in each stage is compared to the predetermined one (S3), and if the measurement for a stage is lower, air is supplied to the stage to make the catalyst generate heat internally (S4), and when the catalyst temperature exceeds the predetermined value, the air supply is shut off (S5). After the catalyst temperatures in all the stages have reached the predetermined temperature, the preheating device is stopped (S6), thus completing the start of the apparatus.

Therefore, according to the present invention, since the catalyst in each catalyst layer generates heat internally at the same time, the whole of the catalyst is heated, the inert gas that was indispensable for conventional systems is no longer required, and as shown in FIG. 3(b), the catalyst layer in each stage can be warmed simultaneously and in parallel. The above-mentioned combustible reforming catalyst 15 is a copper-zinc based reforming catalyst and the oxidation reaction thereof can be expressed by the following equations (1) and (2).

$$Cu + 0.5O_2 \rightarrow CuO + Q1 \quad (1)$$

$$Zn + 0.5O_2 \rightarrow ZnO + Q2 \quad (2)$$

The amounts of generated heat Q1, Q2 in equations (1) and (2) are about 155 kJ/mol and 348 kJ/mol, respectively, which are comparable to the oxidation heat of hydrogen (about 240 kJ/mol). In addition, because the temperature of the combustible reforming catalyst 15 at which oxidation begins is not more than 100 degrees C., the method of the present invention provides a large amount of internal heat generation by only supplying air preheated to the oxidation activation temperature to the combustible reforming catalyst 15 when it is in a reduced state, so it can be understood that the apparatus can be started (cold start) quickly by using this internally generated heat.

Figure 5A:
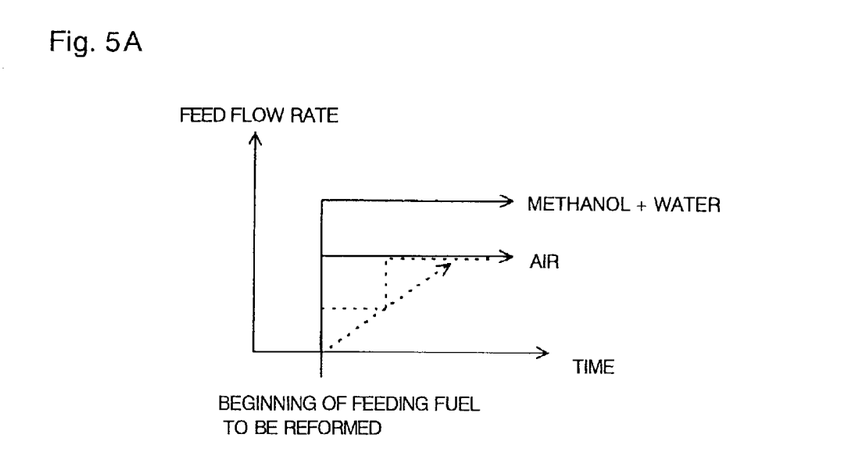
FIGS. 5A and 5B are diagrams showing the method of starting the apparatus according to the present invention when the supply of fuel gas is started.
Figure 5B:
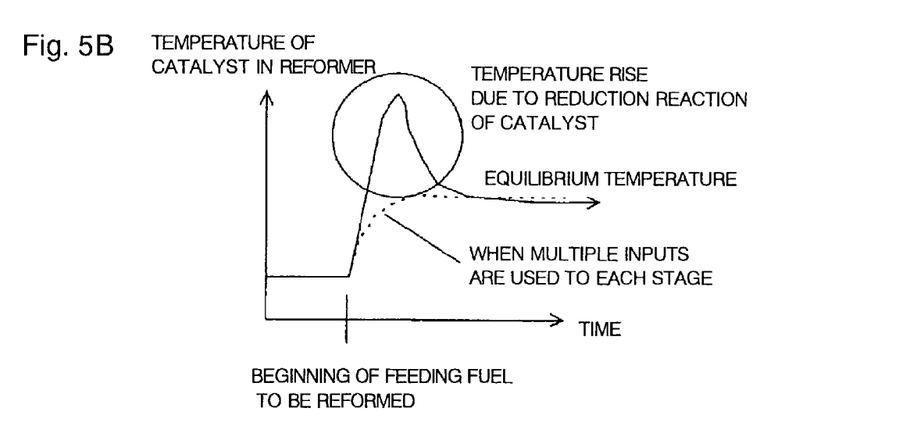

FIGS. 5A and 5B are diagrams describing the starting method when fuel is supplied according to the present invention. FIG. 5A shows the method of feeding the fuel gas (methanol+water) and air, and FIG. 5B is a chart showing catalyst temperatures in the reformer. In each figure, the solid lines and chain lines indicate conventional methods and methods according to the present invention, respectively.

After the combustible reforming catalyst 15 reaches a temperature suitable for combustion and reforming (for example, 170 degrees C. or more), the fuel injector 3a is opened to begin supplying the fuel gas. At that time, as shown by the solid lines in FIGS. 5A and 5B, if the flows of fuel gas (methanol+water) and air are increased in a single step to the required flows, the catalyst temperature quickly increases and temporarily exceeds the withstanding temperature of the catalyst (for instance, 300 degrees C.), which was verified experimentally.

The reaction of the combustible reforming catalyst 15, when the fuel gas and air are supplied, can be expressed by the following equations (3)~(5).

$$CuO \rightarrow Cu + 0.5O_2 - Q1 \quad (3)$$

$$ZnO \rightarrow Zn + 0.5O_2 - Q2 \quad (4)$$

$$H_2 + 0.5O_2 \rightarrow H_2O + Q3 \quad (5)$$

Equations (3) and (4) are formulae for the reactions (reduction reactions) which are the reverse of the aforementioned oxidation reaction equations (1) and (2), in which the absorbed heat amounts Q1, Q2 are about 155 kJ/mol and 348 kJ/mol, respectively. On the other hand, equation (5) shows a hydrogen oxidation reaction with a heat of oxidation Q3 of about 240 kJ/mol. Therefore, when the fuel gas and air are supplied after completing the temperature increase of the combustible reforming catalyst 15, the oxidation reaction of the equation (5) takes place simultaneously with the reduction reactions governed by the equations (3) and (4), and as a result, the catalyst is abnormally overheated.

To prevent this abnormal overheating, according to the method of the present invention, the entire catalyst is heated to a temperature at which the combustion reforming reactions can occur, then the flow of air is temporarily stopped by fully closing, for instance, air injectors 21a, 21b, 21c and the supply of fuel gas is started. As a result, since oxygen is not present or is at least insufficient to sustain combustion under the condition in which the fuel gas reaches the combustible reforming catalyst 15, oxidation of the hydrogen (partial combustion) does not take place, so the catalyst temperatures do not increase. Next, according to the method of the present invention, air injectors 21a, 21b, 21c are opened slightly, and air is supplied by controlling the air flows so that the temperatures in the catalysts do not exceed the withstanding temperature of the catalyst.

Temperature sensors (for instance, thermocouples) are inserted in each of the catalyst layers 15a, 15b, 15c to detect the temperature of each catalyst layer, and detect the highest temperature after air has been introduced. However, temperature sensors need not be inserted individually into each catalyst layer, but instead, the temperatures of the downstream gasses can be measured, for example, and the temperature of each catalyst is estimated and controlled.

[Preferred Embodiments]

Figure 6:
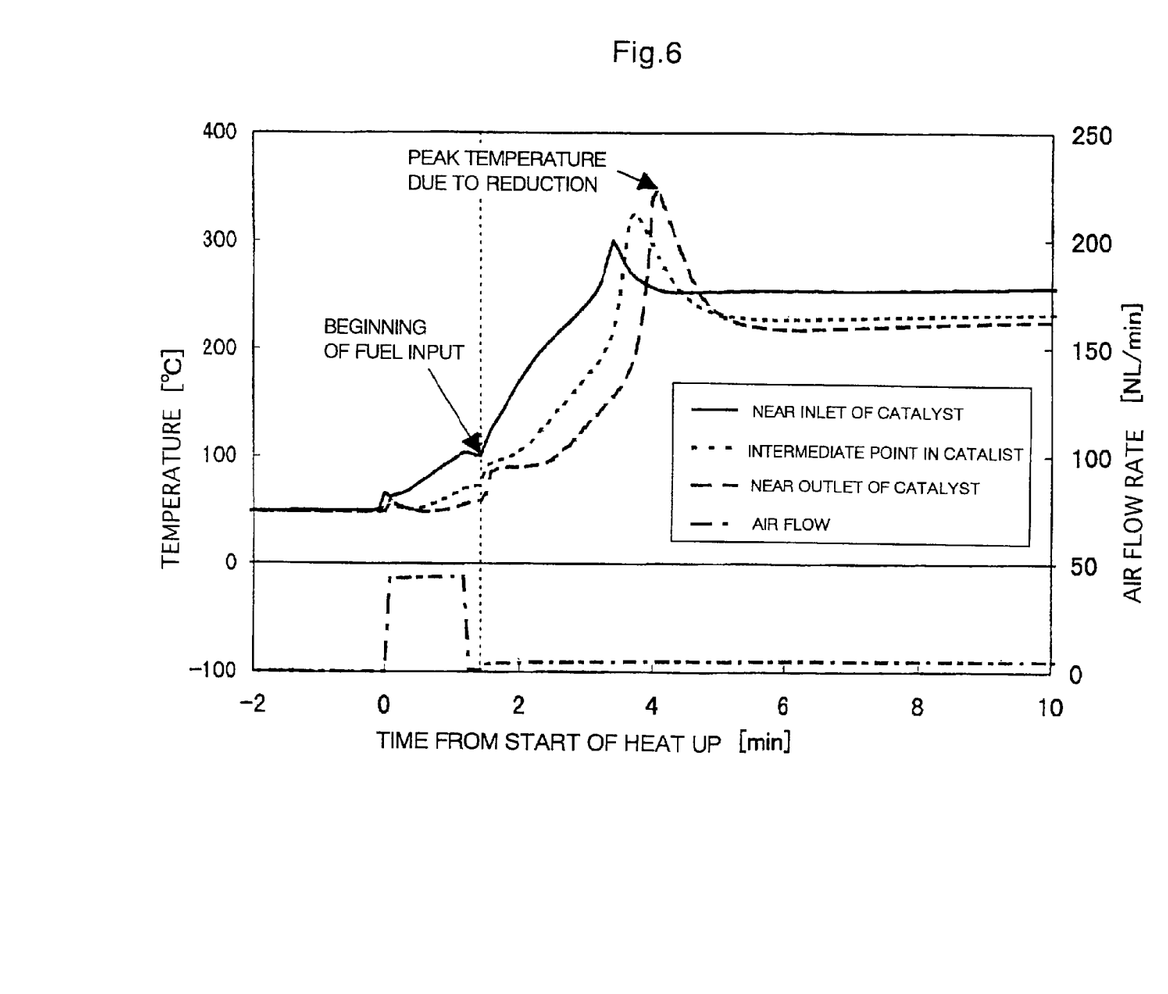
FIG. 6 is a diagram showing the characteristics of an embodiment of the present invention.

FIG. 6 shows the results of a test of an embodiment of the present invention. In this test, warming air and reforming air were supplied in that order from upstream, to a single catalyst. In FIG. 6, the time from the beginning of warming is shown on the abscissa with temperature as the ordinate, the lower chain lines show the temperature of the inlet air, and the 3 upper curves show measured temperatures near the inlet of the catalyst (solid line), an intermediate portion (dotted line) and near the outlet (chain line), respectively.

In FIG. 6, the parameter measured near the inlet of the catalyst (solid line) relates to a case using the method of the present invention. In this case, by supplying a flow of warming air, the catalyst temperature was increased from about 50 degrees C. to 100 degrees C. in about one minute and a half, after that, the supply of air was temporarily stopped, then the flow of reforming air was restarted at a reduced rate, thus the maximum temperature of the catalyst was reduced. As a result, it was confirmed that the starting time for a low-temperature start could be about 3 minutes.

In FIG. 6, as revealed from the measured values at the intermediate portion (dotted line) and near the outlet (chain line), temperatures in the intermediate and outlet portions slowly increased even when air was supplied only from the upstream side. As a consequence, it can be understood that a plurality of stages of catalyst layers must be heated up simultaneously in parallel, as revealed in the present invention.

By means of the aforementioned method and apparatus according to the present invention, when starting from a low temperature since air preheated to a temperature at which the combustible reforming catalyst 15 can be oxidized (for instance, about 100 degrees C.) is supplied from the air feed line 20 while the supply of fuel gas is stopped, the catalyst is made to generate its own heat, and the entire catalyst is heated, so no special equipment or utilities other than the air feed line 20 are needed, and the apparatus can be easily made compact enough to install in a electric vehicle. Also, since the catalyst which is in a reduced state, is oxidized and heats itself when air is supplied, no toxic gasses such as CO are produced and the reforming catalyst and the fuel cell can be protected essentially from the adverse effects of CO.

Moreover, because all stages of a plurality of catalyst layers can be warmed in parallel at the same time, the time taken to raise the temperature can be reduced greatly, and a quick start (cold start) is made possible.

The present invention provides the following advantages as described above.

(1) The start time can be reduced since all stages of a plurality of catalysts layers are warmed in parallel at the same time.

(2) According to conventional starting methods, the temperature of the warming gas must be increased to 200~300 degrees C., however according to the present invention, the temperature required for the catalyst to exhibit the self-heating phenomena due to the oxidation process, and the corresponding input energy can be kept low.

(3) A sudden temperature increase of the catalyst that is in a reduced state can be prevented by supplying oxidizing gas (air) to the multiple stages when the input of reforming fuel is started.

Therefore, the fuel reforming apparatus and its starting method according to the present invention provide excellent effects such as that a quick start (cold start) is made possible, that the reforming catalyst and the fuel cell can be prevented from being poisoned and that no special equipment or utilities are required and the apparatus can be compact enough to be installed in a electric vehicle.

Although the present invention has been described according to a number of preferred embodiments, it is understood that the scope of rights covered by the present invention should not be limited only to these embodiments. Conversely, the scope of rights of the present invention includes all improvements, modifications and equivalent matters belonging to the scope of the attached claims.

What is claimed is:

1. A fuel reforming apparatus comprising:
a partial oxidation reformer filled with a combustible reforming catalyst that converts a fuel gas into a reformed gas containing hydrogen by partially oxidizing the fuel gas and generates heat generated thereby,
an air feed line for feeding air to the partial oxidation reformer,
and a flow controller that controls the flow rate of the air in the air feed line, wherein
when the apparatus is started from a low temperature, the supply of the fuel gas is stopped, and air preheated to a temperature at which the catalyst can be oxidized is fed to the catalyst from the air feed line, in such a manner that the catalyst generates its own heat, and the whole of the catalyst is heated up, and wherein further
the combustible reforming catalyst comprises a plurality of catalyst layers disposed in series with intervals therebetween, and the air feed line comprises a plurality of branch lines that feed air independently into a point upstream of each of the catalyst layers, whereby the preheated air is fed in parallel from each branch line.

2. The fuel reforming apparatus specified in claim 1, wherein each of the catalyst layers comprises a first catalyst disposed upstream and a second catalyst disposed downstream, and the first catalyst has a withstanding temperature higher than the withstanding temperature of the second catalyst and the second catalyst has a reforming capability higher than the reforming capability of the first catalyst.

3. A method of starting a fuel reforming apparatus, wherein
when a partial oxidation reformer filled with a combustible reforming catalyst for reforming a fuel gas containing steam using the heat generated by partially oxidizing the fuel gas is started, while the supply of the fuel gas is stopped, air preheated to a temperature at which the catalyst can be oxidized is fed in, in such a manner that the catalyst generates its own heat, thus the whole of the catalyst is heated up,
wherein the combustible reforming catalyst comprises a plurality of catalyst layers disposed in series with intervals there-between, and when the apparatus is started from a low temperature, while the supply of the fuel gas is stopped, air preheated in a pre-heater is fed to a point upstream of each of the catalyst layers in parallel, in such a manner that the catalyst in each catalyst layer generates its own heat, thus the whole of the catalyst is heated up, wherein after the whole of the catalyst is heated to a temperature at which a combustion/reforming reaction can take place, feeding air is temporarily stopped, the supply of the fuel gas is started, next the flow rate of the air is controlled to feed the air in such a manner that the temperatures in the catalyst do not exceed the temperature that the catalyst can withstand.

4. The method of starting a fuel reforming apparatus specified in claim 3, wherein after the whole of the catalyst is heated to a temperature at which a combustion/reforming reaction can take place, feeding air is temporarily stopped, the supply of the fuel gas is started, next the flow rate of the air is controlled to feed the air in such a manner that the temperatures in the catalyst do not exceed the temperature that the catalyst can withstand.

5. A method of starting a fuel reforming apparatus comprising the steps of:
(a) providing a fuel reforming apparatus comprising:
   i. a partial oxidation reformer filled with a combustible reforming catalyst that converts a fuel gas into a reformed gas containing hydrogen by partially oxidizing the fuel gas and using the heat generated thereby;
   ii. an air feed line for feeding air to the partial oxidation reformer; and
   iii. a flow controller that controls the flow rate of the air in the air feed line, whereby when the apparatus is started from a low temperature, while a supply of the fuel gas is stopped, air preheated to a temperature at which the catalyst is oxidized is fed from the air feed line so the catalyst generates its own heat, and the whole of the catalyst is heated up, wherein the combustible reforming catalyst comprises a plurality of catalyst layers disposed in series with intervals there-between and the air feed line comprises a plurality of branch lines that feed air independently into a point upstream of each of the catalyst layers, whereby the preheated air is fed in parallel from each branch line;
(b) starting the apparatus when the partial oxidation reformer is filled with the combustible reforming catalyst for reforming a fuel gas containing steam by partially oxidizing the fuel gas to generate heat; and
(c) feeding, while the supply of the fuel gas to the apparatus is stopped, air preheated to a temperature at which the catalyst is oxidizable into the reformer so the catalyst generates heat, whereby the whole of the catalyst is heated up.

* * * * *